REFLEX AMPLIFIER CIRCUITS

Filed June 15, 1951

INVENTORS.
RINALDO E. DeCOLA
CHARLES E. HONEYWELL
BY J. U. Douglas
THEIR ATTORNEY.

United States Patent Office 2,778,932
Patented Jan. 22, 1957

2,778,932

REFLEX AMPLIFIER CIRCUITS

Rinaldo E. De Cola and Charles E. Honeywell, Park Ridge, Ill., assignors to Admiral Corporation, Chicago, Ill.

Application June 15, 1951, Serial No. 231,854
2 Claims. (Cl. 250—20)

Figures 1, 2, 3:
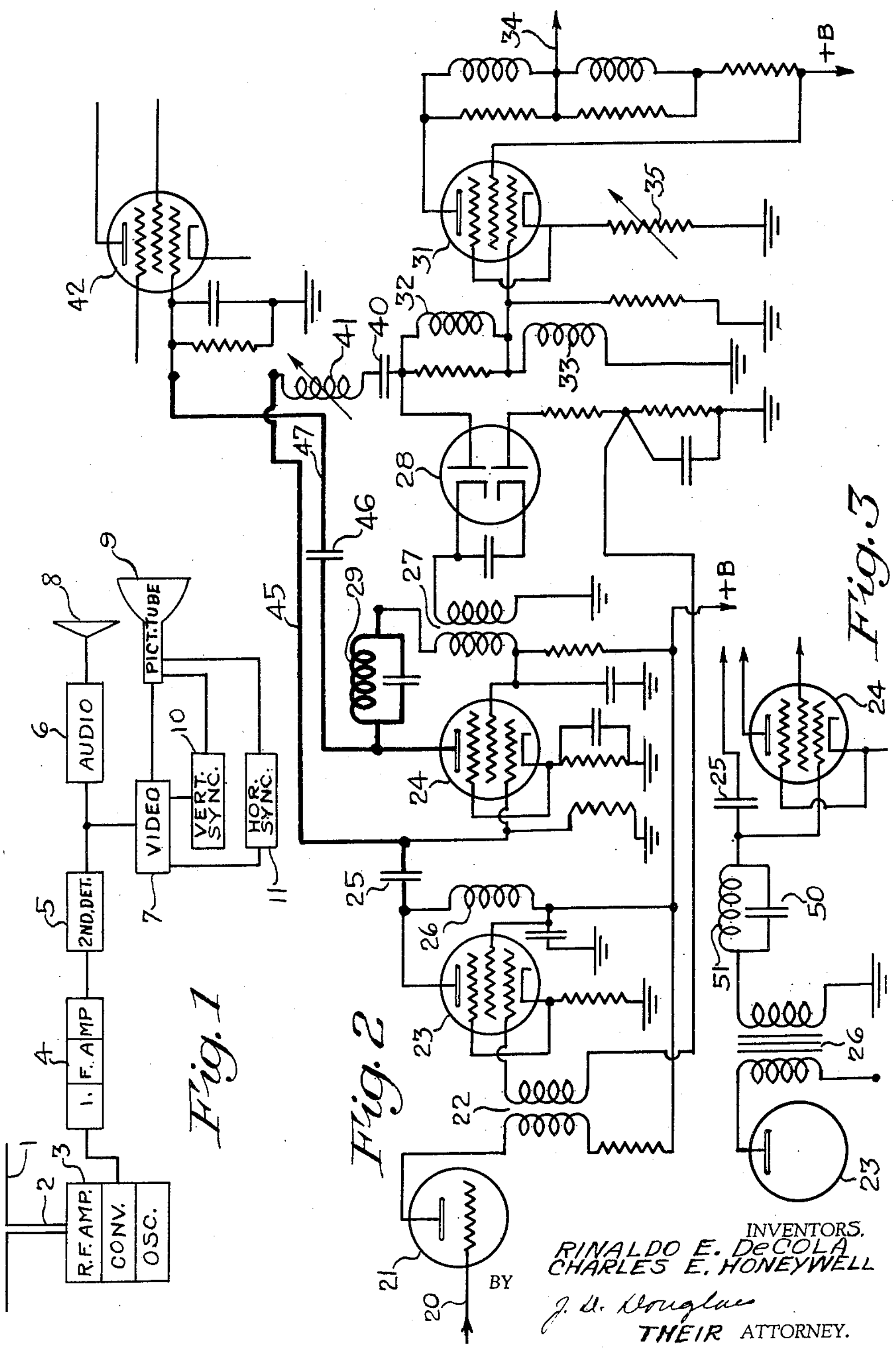

This invention relates to improvements in electronic circuits, and more particularly to an improved amplifier circuit that is useful in connection with television receivers.

In the operation of certain types of amplifier circuits, it frequently happens that it is desirable to increase the amplitude of a certain band of frequencies that may be at a lower level or to raise the level of a portion of a band of frequencies for some purpose.

It has become common practice to utilize a system for the amplification of the television signals where both the amplitude modulated video signal and frequency modulated audio signal are amplified by a single amplifier. The two signals are then separated at the second diode detector, the audio portion of the signal being conducted to an audio frequency amplifier and thence to the loud speaker and the other parts to the video amplifier, and hence to the picture tube and associated controls. Such a system is commonly known as "intercarrier sound" and is more fully described in the patent to L. W. Parker, No. 2,448,908 of September 8, 1948.

It is also recognized that in the composite television signal the audio component is at a considerably lower amplitude than the video component. In some systems it may be as much as 40 db lower than the video part of the signal. Initially, this difference in amplitude is desirable in order that the sound signal does not disturb the picture or video signal. If this ratio is maintained at a higher ratio, there is less amplitude modulation on the frequency modulated wave and less buzz is realized in the audio signal. Inasmuch as in the system described above the sound portion is at a lower amplitude than the video portion, additional amplification is required in order to bring the audio portion of the signal up to the desired level, it being common practice to provide two sound I. F. amplifiers immediately after the diode to obtain the desired gain.

Some of the disadvantages of the above system which are well known to those versed in the art include the generation of what is known as "intercarrier buzz." This is due to the sending of the 4.5 mc. signal through the video amplifier which results in a clipping of the signal at a 60 cycle rate, and occurs when the gain is raised to the point where the video amplifier overloads.

Another disadvantage inherent in the conventional "intercarrier sound" system is the resultant variation in sound level when changes are made in the contrast control.

By the present invention increased gain is provided for driving the audio amplifier, without the use of extra audio frequency amplifier tubes and their accompanying circuits. Because of the increased gain, additional limiting action may be more easily realized, thus increasing the noise immunity of the sound portion of the receiver. It will be apparent that by decreasing the number of components, the cost of the receiver is reduced, not only by the cost of the components that are eliminated, but due to the fact that since fewer tubes may be used, power consumption is reduced and the power furnishing components of the receiver may have a lower current rating.

Briefly, the invention in its broader aspects comprises selecting a relatively narrow portion of a band of frequencies from a composite signal comprising a relatively wide band of frequencies and feeding that narrow portion of the signal back to the original amplifier of the composite signal to increase the amplitude of a portion of the composite signal without the use of extra amplifiers.

In greater detail, the invention specifically provides for the extraction of the low level frequency modulation sound portion in the form of a heterodyne from the composite signal and feeding it back in proper phase to the broad band amplifier where the gain of that portion of the signal is increased.

Although the invention about to be described will be described in specific detail in connection with its use in conjunction with the amplification of the sound portion of an "intercarrier sound" television receiver, it will be appreciated that the invention will have many other uses than that specifically described, which uses will be apparent to those versed in the art.

In order that the invention may be more clearly understood, reference may be had to the accompanying drawing which illustrates this specification and wherein:

Fig. 1 is a block diagram of a conventional intercarrier sound television receiver; and Fig. 2 is a detailed circuit diagram of that portion of the circuit of such a receiver with which the invention is particularly concerned; and Fig. 3 is a diagram of a modified portion of the circuit.

Throughout the drawings, like parts are designated by like reference characters.

As can best be seen from Fig. 1, an "intercarrier sound" television system includes the antenna 1 connected by a transmission line 2 to the first section 3 of the receiver which may be conventional and include an R. F. tuner and amplifier, a converter and a local oscillator. In this section, the signals are received and converted to a lower frequency composite signal which is amplified in the intermediate frequency amplifier 4. It will be noted that this amplifier operates to amplify all of the signals including amplitude modulated video, synchronizing pulses, and frequency modulated audio. The signals are then detected in the second detector 5, the output of which is connected to the audio amplifier 6 and the video amplifier 7. The audio amplifier connects to the loud speaker 8 where the sound is made audible.

The video amplifier amplifies the composite video signal, the audio signal being eliminated by suitable rejection circuits, and is applied to the picture tube 9. The usual vertical and horizontal control circuits 10 and 11 are provided, being controlled by the signals from the video amplifier.

As described in the Parker patent, the video and audio portions of the signal being 4.5 mc. apart, there is provided a 4.5 mc. heterodyne which contains all of the intelligence, including the sound signal, which, as stated, is at a relatively low level. Previously, this signal was filtered and passed only the 4.5 mc. signal being amplified to the audio amplifier. Inasmuch as this was a frequency modulation signal, the other undesirable signals present were eliminated during the process of detection. Heretofore, the signal was removed from the output of the last video amplifier, amplified and then detected by the usual frequency modulation detector.

In Fig. 2, there has been shown some of the later intermediate frequency amplifier stages of a receiver. These are connected to the second detector circuit, and the output from the second detector is transferred to the sound amplifier and the video amplifier.

In this circuit, the signal to the input, indicated at 20, comprises the signal as received from the transmitting station and was a relatively high frequency signal and has now been converted to a composite signal of a lower frequency that may be more readily handled in this amplifier. The signal may thus include frequencies between 21 and 26 mc. The sound signal in this instance being frequency modulated about a 21.25 mc. center or carrier frequency and the video, amplitude modulated on a 25.75 mc. carrier, it being understood that the transmission is the usual vestigial side band transmission. Also present in this portion of the circuit will be the 4.5 mc. beat frequency which is the frequency difference between the two carriers. It will be appreciated that these frequencies are a matter of choice by the designer and are, in general, the standard frequencies selected by the industry. For instance, with the advent of higher frequency transmissions (U. H. F.), these frequencies may be between 41 and 46 mc.

The composite signal is amplified by the combination of the tube and the interstage coupling transformer 21 and 22 and transferred to the input of the next stage, which may be the second intermediate frequency stage, the input of which may be conventional and includes the tube 23.

In order to more clearly depict the changes that are needed to carry into effect the invention, the drawing is arranged so that the full light lines indicate the parts of the circuit that are unchanged over the prior art. The dotted lines indicate the circuit parts that are eliminated, and the heavy solid lines the parts that are added.

From the anode of the tube 23, the signal is capacitively coupled to the grid of the third I. F. tube 24 by the coupling condenser 25. It will be noted that the interstage coupling transformer between tubes 23 and 24 is eliminated and only the coil 26 used in the plate circuit of the tube 23, and that the coupling condenser is the added element.

The output of the tube 24 is coupled inductively through the I. F. transformer 27 to the dual diode rectifier 28. It will be noted that the anode of tube 24 is connected to the primary of the transformer through a coil 29 which has replaced a direct lead. The coil 29 is a 4.5 mc. coil, i. e., it is one having a high impedance to a 4.5 mc. signal, being parallel tuned to that signal. This coil is preferably one having a high Q. The distributing capacity may be sufficient tuning for this coil or additional capacity may be provided across the coil if desired.

The only concern of this invention is with the upper half of the diode 28 since the lower half merely provides a rectified and filtered voltage of negative polarity which provides an automatic gain control voltage.

Rectification of the signal occurs in the upper half of the diode, and at the anode of this tube there is present a demodulated signal which results from the amplitude modulated signal, this being the video signal having a frequency range from 0 to 4.5 mc. or somewhat less. There is also present the 4.5 mc. beat note, which is a frequency modulated signal.

The signals in the output of the diode 28 are transferred through one branch of the ensuing circuit to the grid of the video amplifier 31, the peaking coils 32 and 33 being used for compensating purposes. The picture signal as it hits the grid of the tube 31 is in the negative phase. It is amplified in the tube under control of the contrast control 35. The output circuit of the amplifier 31 is conventional so far as this invention is concerned, it being provided with further compensating circuits and connected by lead 34 directly to the cathode of the picture tube.

In the other branch of the circuit, the signal, which includes the signal that is desired (4.5 mc. frequency modulated 25 kc. on each side of center frequency) passes through the blocking condenser 40 and then the coil 41. Originally, the signal was then conducted to the grid of one or more audio I. F. amplifier tubes such as 42 where it was amplified and then subsequently detected in the usual manner. The coil 41 is resonant at 4.5 mc. by means of the capacity of tube 24 and stray capacity and therefore of high impedance to the desired signal, acting as a diode load providing increased voltage gain.

Instead of being connected directly to the grid of the amplifier tube 42, the signal is fed back to the grid circuit of the tube 24 through the lead 45 where it is amplified resulting in an increased amplification of the narrow band frequency modulated 4.5 mc. signal in that tube.

The coil 29, because of the frequency range of this signal, acts as the anode load. The primary of the transformer 27 which was designed to carry signals in the range between 21 and 26 mc. acts as a short circuit for this lower frequency signal, and there is no material transfer of signals of this frequency through the coupling transformer in this circuit which would tend to cause regeneration.

The signal is then taken from the anode of the tube 24 which is connected through the capacity 46 and lead 47 to the input to the sound I. F. amplifier tube 42.

It will be noted that the reflexing of the narrow band frequency modulation signal, suitable parameters of the circuit components being maintained, is such that the weaker frequency modulation signal is greatly increased in amplitude, and sufficient gain can be realized as could be had if extra tubes were used without deleterious effects. In actual construction of the circuit, proper isolation of the circuit elements, according to good engineering practice, is observed to prevent undesirable regeneration and resultant self oscillation.

As previously stated, one way of isolating the 4.5 mc. beat note from the composite I. F. signal from the tube 24 was to provide the coil 29 and the primary of 26 or the equivalent thereof.

In Fig. 3 the circuit is shown with the interstage transformer 26 substantially unchanged. In order to provide the isolation, a parallel coil and condenser combination 50—51 which is resonated to 4.5 mc. is placed in series to the lead from the secondary of the transformer 26 to the grid of the next tube. The signal, after being reflexed back through the amplifier tube 24 is received from the plate of tube 24 as in Fig. 2.

It will be obvious to those versed in the art that, with the teachings of our invention, other modifications could be made coming within the spirit thereof.

We claim:

1. In a television receiver, the combination of an amplifying device having an input and an output, means for applying to the input of said amplifying device a composite television signal which includes a video carrier amplitude modulated by video information and a sound carrier frequency modulated by sound information and having a different frequency than said video carrier, a video detector having an input and an output, signal transfer means coupled between the output of said amplifying device and the input of said detector and operative to pass to the detector the amplified modulated video and sound carriers and to prevent from passing to the detector signals at substantially the difference frequency between said carriers, means coupled to the output of said detector to recover the video information, impedance means coupled between the output of said detector and the input of said amplifying device for passing from the detector to the input of the amplifying device a signal having a carrier at the difference frequency between said video and sound carriers which is frequency modulated by sound information, and means coupled to the output of said amplifying device for passing the amplified difference frequency carrier which is frequency modulated by sound information.

2. In a television receiver, the combination of an amplifying tube having an input and an output, means for applying to the input of said tube a composite television signal which includes a video carrier amplitude modulated by video information and a sound carrier frequency modulated by sound information, said sound carrier having a different frequency and a substantially lower amplitude than said video carrier, a video detector having an input and an output, signal transfer means coupled between the output of said amplifying tube and the input of said detector and operative to pass to the detector the amplified modulated video and sound carriers and to prevent from passing to the detector signals at substantially the difference frequency between said carriers, a first load coupled to the output of the detector to recover the video information, a feedback network coupled to the output of said detector as a second load and parallel resonant at substantially said difference frequency, said feedback network including inductance means and the input of said amplifying tube as its resonance-determining elements and being operative to feed back from the detector to the amplifying tube a signal having a carrier at said difference frequency which is frequency modulated by sound information, and means coupled to the output of said amplifying tube for passing the amplified difference frequency carrier which is frequency modulated by sound information.

References Cited in the file of this patent

UNITED STATES PATENTS

| | | |
|---|---|---|
| 1,774,834 | Lewis | Sept. 2, 1930 |
| 2,205,243 | Dome | June 18, 1940 |
| 2,455,711 | Sziklai | Dec. 7, 1948 |
| 2,528,222 | Foster | Oct. 31, 1950 |
| 2,570,016 | Loon | Oct. 2, 1951 |
| 2,582,100 | Broos | Jan. 8, 1952 |
| 2,640,917 | Phinney et al. | June 2, 1953 |

FOREIGN PATENTS

| | | |
|---|---|---|
| 645,849 | Great Britain | Nov. 8, 1950 |

OTHER REFERENCES

Rider Television Manual vol. 4, page: "Midwest TV Page 4–5."

Radio Electronics, September 1949, pages 30 and 31.